Oct. 3, 1967

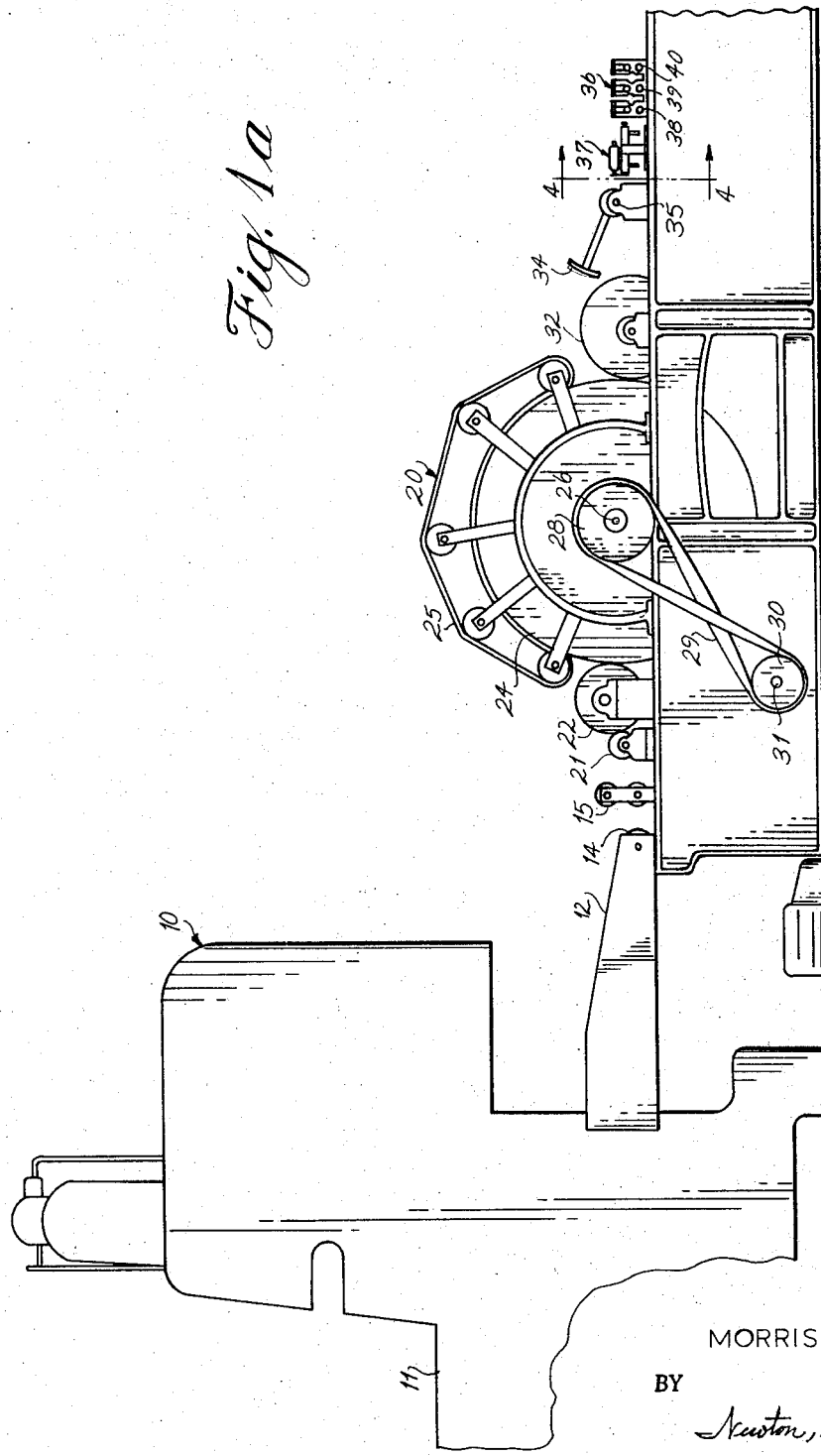

M. M. BRYAN, JR 3,344,479

APPARATUS FOR CLEANING FIBERS

Filed Oct. 23, 1964

INVENTOR.
MORRIS M. BRYAN JR.

BY

ATTORNEYS

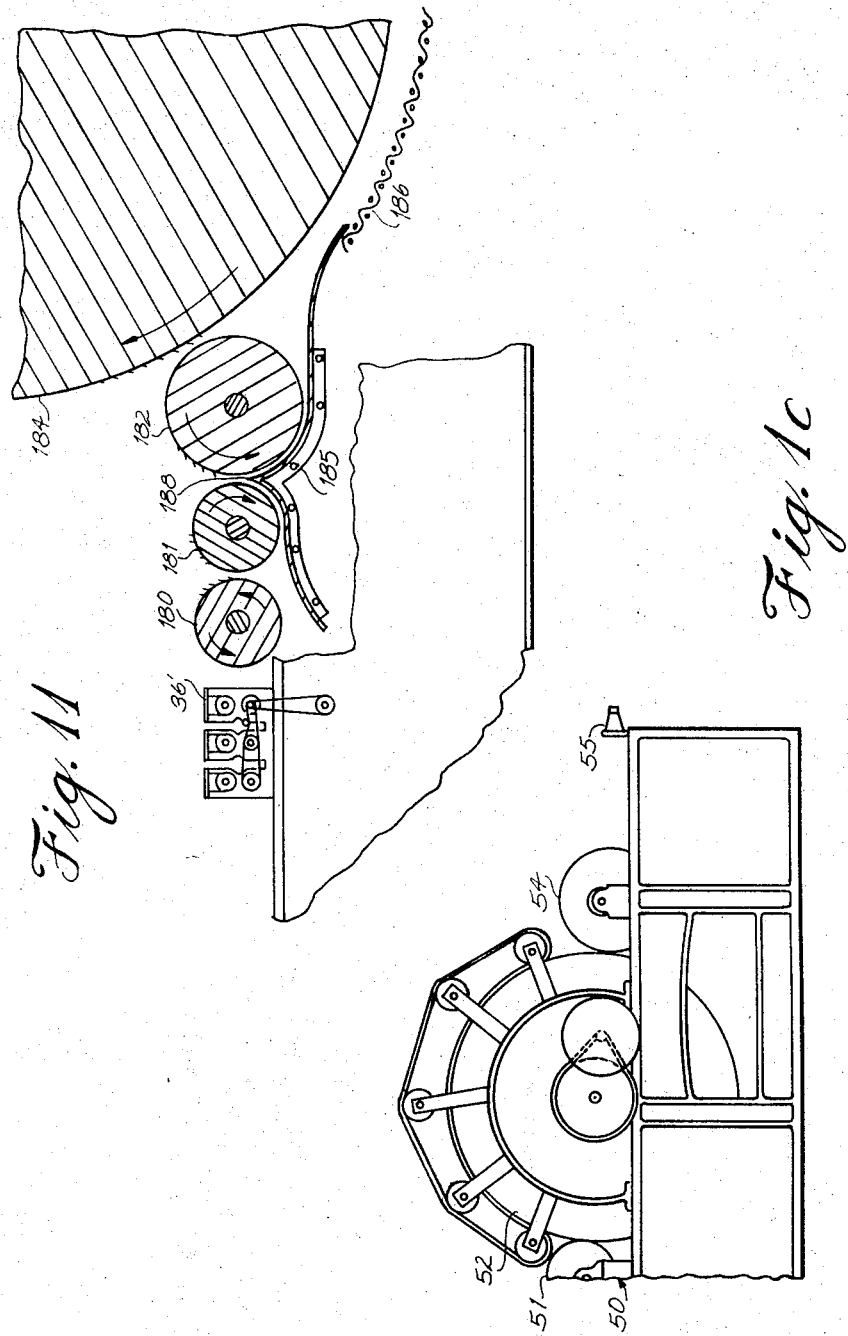

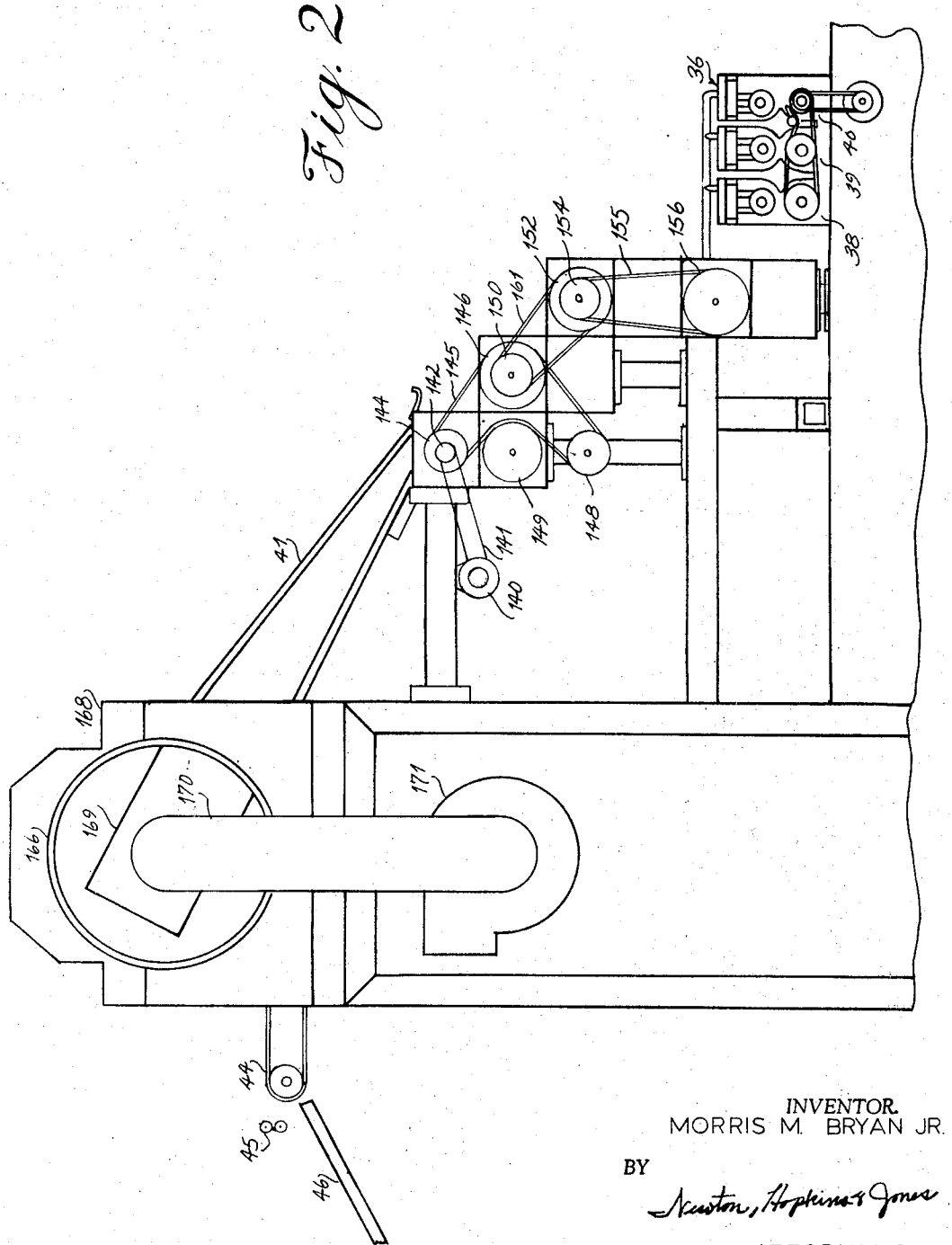

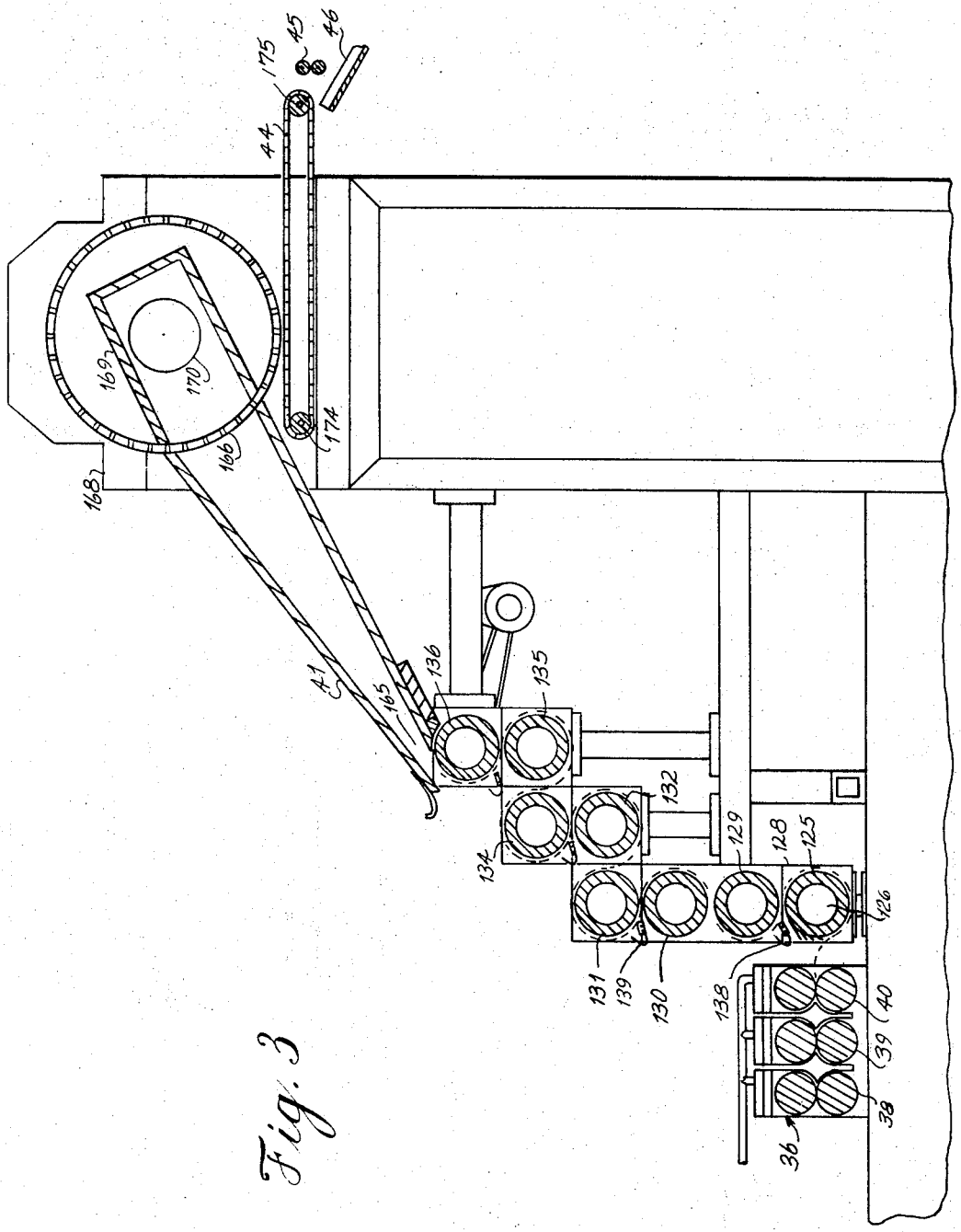

INVENTOR.
MORRIS M. BRYAN JR.
BY
ATTORNEYS

INVENTOR.
MORRIS M. BRYAN JR.

ATTORNEYS

INVENTOR.
MORRIS M. BRYAN JR.
BY
ATTORNEYS

Oct. 3, 1967  M. M. BRYAN, JR  3,344,479
APPARATUS FOR CLEANING FIBERS
Filed Oct. 23, 1964  9 Sheets-Sheet 9

INVENTOR.
MORRIS M. BRYAN, JR.
BY
Newton, Hopkins & Jones
ATTORNEYS

United States Patent Office 3,344,479
Patented Oct. 3, 1967

3,344,479
APPARATUS FOR CLEANING FIBERS
Morris M. Bryan, Jr., Jefferson, Ga., assignor to The Jefferson Mills, Inc., Jefferson, Ga., a corporation of Georgia
Filed Oct. 23, 1964, Ser. No. 405,915
9 Claims. (Cl. 19—65)

This invention relates to textile apparatus, and is more particularly concerned with a method of and apparatus for, cleaning and orienting fibers.

Heretofore extensive cleaning machines have been utilized before the cotton is fed into a carding machine. These previous cleaning machines have consisted of various forms of beaters, jets of air, cylindrical spikes, grid bars, etc. All of these machines have tried to tear up cotton into small bits and clean the small bits; and, they did accomplish some cleaning, but to only a small extent since they were attempting to remove trash from chunks of cotton.

It is impractical to try to remove dirt and other trash from chunks of cotton because the entangled fibers that make up the chunk hold much of the trash and will not permit it to fall out regardless of the external forces applied; and, it is impossible to draft the fibers while they are in chunks, before they are disentangled.

The method and apparatus of the present invention overcome the abovementioned difficulties by providing for the disentangling of the fibers before any primary attempt is made to remove trash from the fibers. When the individual fibers have been disentangled and each fiber is completely separated from the chunks, or balls, of fiber, it is quite effective to exert forces on the fibers so that the forces will separate the trash from the fibers.

The method and apparatus of the present invention therefore provide a high degree of cleaning of cotton using a minimum of apparatus. The apparatus is relatively compact, and lends itself very well to many particular forms of apparatus to achieve the desired results at a high rate of output. All of the apparatus is very simple both in construction and in operation, and is well designed to give a long, trouble free life.

These and other features and advantages of the present invention will become apparent from consideration of the following specification when taken in conjunction with the accompanying drawings in which:

FIG. 1a is a side elevational view of a portion of the apparatus embodying the present invention, and showing the feeding means and the web forming means;

FIG. 1c is a further continuation of FIGS. 1a and 1b, and shows the exit end of the apparatus;

FIG. 2 is an enlarged side elevational view of the apparatus showing the opposite side of a portion of the apparatus shown in FIG. 1b;

FIG. 3 is a longitudinal cross-sectional view of that portion of the apparatus shown in FIG. 1b;

FIG. 4 is a tranverse cross-sectional view taken substantially along the line 4—4 in FIG. 1a;

FIG. 11 is a partial longitudinal cross-sectional view showing a second embodiment;

Figure 1B:
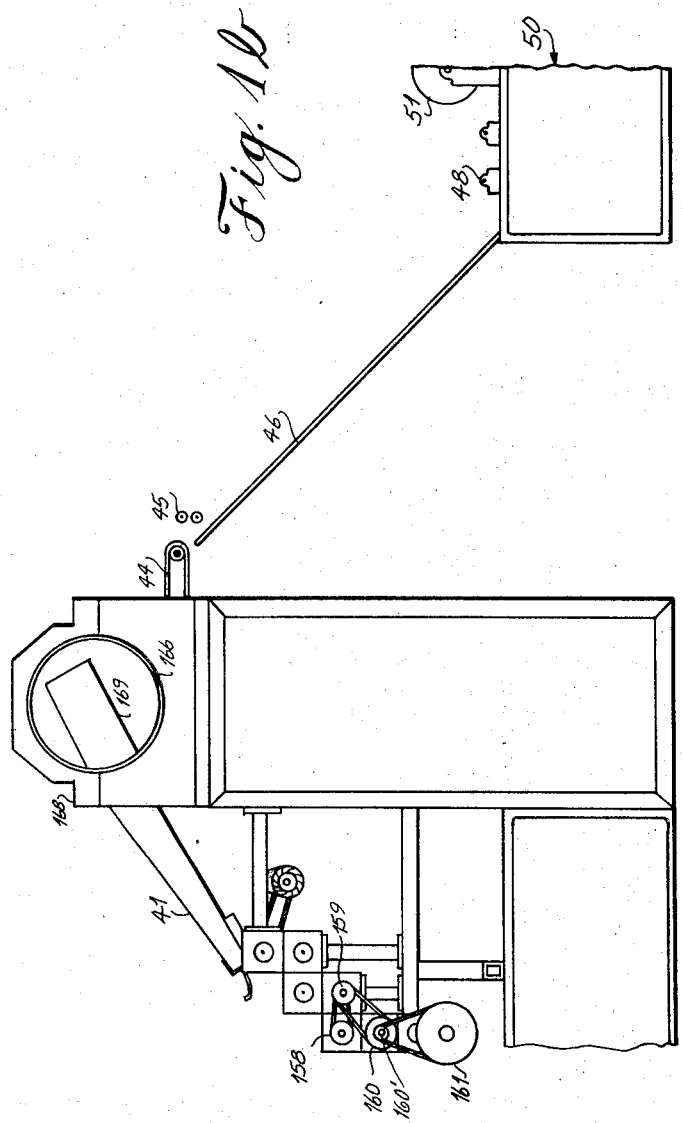
FIG. 1b is a continuation of FIG. 1a and shows the central portion of the apparatus.

Referring now particularly to the drawings, and to those embodiments chosen by way of illustration, the apparatus shown in FIGS. 1a, 1b and 1c, includes a feeder 10 commonly known as a Bramwell feeder. The feeder 10 has a hopper 11 into which cotton is placed; and the cotton is fed in weighed batches to an apron 12. The apron 12 has a presser roll 14 which presses the cotton into a semblance of a bat and the bat is fed to calender rolls 15. The calender rolls 15 put the cotton into a condition approximating a lap to be fed to the carding machine 20.

The carding machine 20 is constructed in a conventional manner, and includes a feeder roll 21 that feeds cotton into the licker-in 22; and, the licker-in feeds cotton to the carding cylinder 24. The carding cylinder 24 is provided with moving flats 25 which, preferably, move in the direction opposed to the movement of the carding cylinder 24. It will be understood that the carding cylinder 24 is driven in a conventional manner on the opposite side from that shown in FIG. 1a; and, the shaft 26 of the carding cylinder 24 is provided with a pulley 28 which drives, through a belt 29, a pulley 30 that is attached to a shaft 31. The shaft 31 is arranged to drive the licker-in 22.

On the exit side of the carding cylinder 24, there is a doffer roll 32. The doffer roll 32 is driven in a conventional manner, and is positioned substantially tangent to the carding cylinder 24 to doff the fibers from the carding cylinder 24; and, there is a comb 34 to aid in the removal of the web of fibers from the doffer roll 32. The comb 34 is adapted to be oscillated towards and away from the doffer roll 32, oscillating about its shaft 35. The comb 34 strikes the web of fibers to remove the web and prevent it from being carried around the doffer roll a second time.

The feeder 10 and the carding machine 20 are both conventional in construction; but, the speeds of the machines are greater in the present arrangement. The carding cylinder 24 is run at about 330 or 340 r.p.m., and the licker-in and doffer are driven at proportionally higher speeds. At this speed, the web is removed from the doffer roll 32 at about 1500 inches per minute and continues to travel at about 1500 inches per minute.

The greater speed of the carding machine gives a much greater output of material; and, though the cleaning done by the carding machine may be reduced, the cleaning is of secondary importance to the primary function of the carding cylinder in this invention namely to put the cotton fibers into a web form.

After the web passes from the comb 34, it goes by a shaker 37, then into a series of drafting rolls generally designated at 36 in FIG. 1a of the drawings. There are three pairs of rolls 38, 39 and 40, each successive pair of rolls being driven at a higher speed than the preceding pair to provide drafting, or drawing out, of the web from each pair of rolls. This will be discussed in more detail hereinafter.

From the drafting rolls 36 the web passes to one of the series of rolls which provide further cleaning. The fiber is picked up by the first of the rolls, and passes between each of the rolls, taking a serpentine path until it reaches the topmost roll where it is doffed therefrom by a current of air. Again, each of the rolls is driven at a successively higher speed to provide drafting, or drawing out, of the fiber. The web from the drafting rolls 36 is fed to the first of the series of rolls, and is drawn out into a thinner and thinner web until the web is substantially destroyed, there remaining but a tenuous collection of fibers on the topmost roll. This collection of fibers is doffed by a current of air, which substantially individualizes, or separates, the fibers further into very small groups of fibers which are carried by the air stream through the duct to be collected into a bat on the collecting screen 166. The bat then falls from the collecting screen 166 to a belt 44 from which the fiber passes between calender rolls 45, down a chute 46, and to a feed roll 48 of a second carding machine 50. The fiber is fed by the feed roll 48 into the licker-in 51, then into the carding cylinder 52 of the carding machine 50. A doffer roll 54 removes fiber from the carding cylinder 52; and, the web passes from the doffer roll 54 with the aid of conventional apparatus (not shown in FIG. 1c) into a trumpet 55 to form a sliver.

The carding machine 50 is also driven at a high rate of speed to give the increased rate of production. Since the primary purpose of the carding machine 50 is to form a web from the bat, any resulting loss in the amount of cleaning and parallelization of fibers is not detrimental to the overall process.

The carding machine 50 is used to form a web from the bat; however, it is possible to run the bat through a trumpet, and through drafting rolls without forming a web from the bat. Whether or not a web is formed is a matter of choice, depending on the next processing of the fiber.

Figure 4:
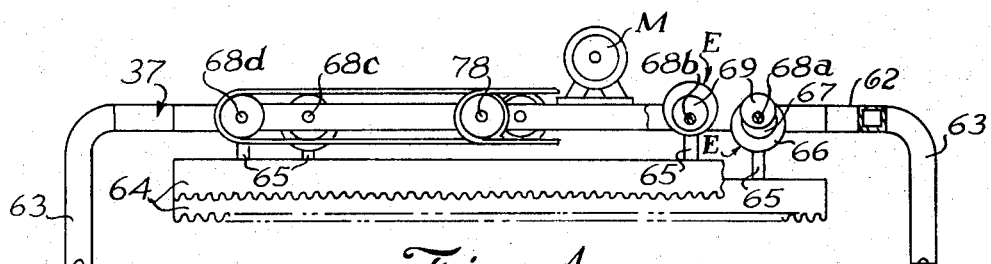
Figure 5:
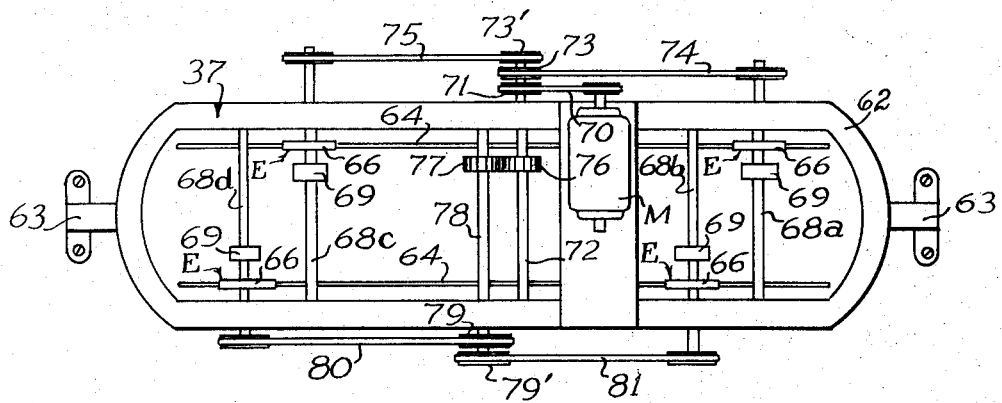
FIG. 5 is a top plan view of the device shown in FIG. 4.

Attention is now directed to FIGS. 4 and 5 of the drawings which show the shaker 37 in more detail. The shaker 37 includes a substantially oval frame 62 which is supported by legs 63 extending from each end of the frame 62. The legs 63 are attached to the bed of the carding machine by bolts or the like.

The shaker 37 has a pair of blades 64 which are moved in a reciprocatory fashion to beat on the web of fibers as the web passes beneath the blades 64. To move the blades 64, each blade is supported by a pair of shanks 65 which are attached to eccentrics E; and, each eccentric E includes a hub 66 having a disc 67 rotatably mounted therein such that the disc 67 can rotate while the hub 66 is stationary with respect to the shank 65. The disc 67 is eccentrically mounted on a shaft such as shaft 68a, the shaft 68a extending between the side members of the frame 62, and being journaled for rotation in the frame 62.

It will thus be seen that, as the shaft 68a is rotated, the disc 67, which is attached thereto, will rotate; and, since the disc 67 is eccentrically mounted on the shaft 67, the hub 66 will move in a somewhat circular pattern, causing a reciprocatory motion of the shank 65, hence of the blade 64.

To reduce the vibration transmitted to the frame 62, there is a counterweight 69 adjacent each of the eccentrics E. The counterweight 69 is a cylindrical weight that is mounted eccentrically on the shaft 68a, and has its eccentricity 180° from that of the eccentric E. It will thus be seen that the counterweights 69 will counteract the forces exerted by the blade 64 and its eccentrics E.

Each of the blades 64 is carried by two shanks 65, two eccentrics E, and two of the shafts 68a, 68b, 68c and 68d; therefore, there are four of the eccentrics and four shafts. All of the shafts 68a, 68b, 68c and 68d are driven by a single motor M that is mounted on the frame 62. The motor M drives, through a belt 70, a pulley 71 that is on a shaft 72. The shaft 72 has two pulleys 73 and 73' mounted thereon, the pulley 73 driving, through a belt 74, the shaft 68a; the pulley 73' drives, through a belt 75, the shaft 68c; and, a gear 76 that is on the shaft 72 between the members of the frame 62 drives a complementary gear 77 that is on a shaft 78. The shaft 78 has a pair of pulleys 79 and 79'; the pulley 79 drives, through belt 80, the shaft 68d; and, the pulley 79' drives, through belt 81, the shaft 68b.

It will thus be seen that the shaft 72 drives the shafts 68a and 68c in one direction; and, the shaft 78 drives the shafts 68b and 68d in the opposite direction causing the blades 64 to move in reciprocatory patterns, but in opposite directions.

In the embodiment of the invention here presented, the web of fibers is moving at a rate of approximately 1500 inches per minute; therefore, it is preferable that each of the blades 64 makes approximately 1500 reciprocations per minute. This causes each of the blades 64 to strike each inch of the web one time, hence each inch of the web will be struck two times: once by each of the blades 64.

Figure 6:
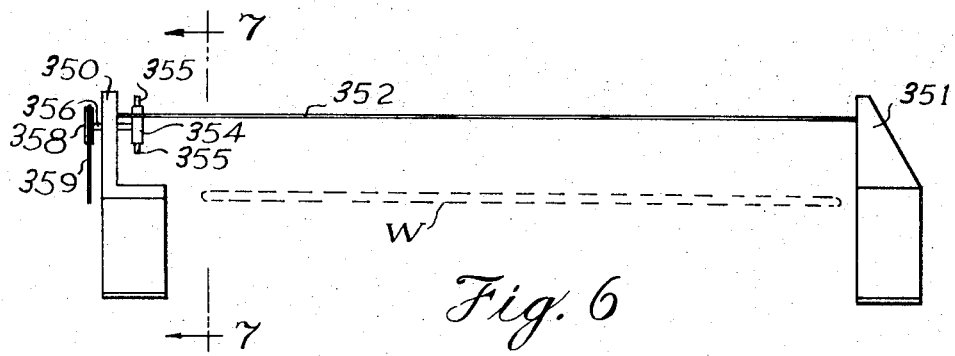
FIG. 6 is a cross-sectional view similar to FIG. 4, but showing a modified form thereof.
Figure 7:
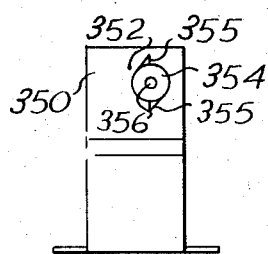
FIG. 7 is a cross-sectional view taken along the line 7—7 in FIG. 6.

The shaker shown in FIGS. 4 and 5 of the drawings is limited because it uses a mechanical arrangement, and the stresses on the structure will increase as the frequency of vibration increases; therefore, such an arrangement cannot easily provide a very large number of vibrations per minute. However, it is desirable to exert a force on the web of fibers as often as possible to get more efficient removal of dirt from the web. The device shown in FIGS. 6 and 7 of the drawings provides means for exerting a force against the web at extremely high frequencies. This device utilizes sound waves to exert the force; therefore, the frequency can be extremely high, even beyond the range audible to the human ear.

The device shown includes a pair of brackets 350 and 351 mounted on each side of the frame of the carding machine. There is a wire 352 such as a piano wire, stretched between the two brackets 350 and 351, the wire being stretched very taut. It will be noticed from FIG. 6 that the wire 352 is somewhat above the web W, the distance being sufficient that, as the wire 352 vibrates, the wire will not engage the web W.

To cause the wire 352 to vibrate, there is a wheel 354 mounted on the bracket 350 adjacent the wire 352. The wheel 354 has a pair of lugs 355; and, the wheel 354 is so spaced from the wire 352 that, as the wheel 354 rotates, the lugs 355 will periodically engage the wire 352 and pluck the wire to cause it to vibrate. The wheel 354 is mounted on a shaft 356, and the shaft 356 is provided with a pulley 358 that is driven by the belt 359. The belt 359 can be driven from any convenient power source on the carding machine.

It will thus be seen that, as the wheel 354 is rotated, the lugs 355 will engage the wire 352 and cause the wire to vibrate. The vibrations of the wire 352 will set up sound waves some of which will be directed toward the web W. Sound waves are normally considered to comprise bands of high presssure air alternating with bands of low pressure air; thus, the high pressure air will engage the web W and act as a shaker to remove dirt from the web. The higher the frequency of sound, the closer together are the bands of high pressure air, so a high frequency sound wave can provide a shaker with a frequency much in excess of the 1500 strokes per minute of the mechanical device shown in FIGS. 4 and 5; and, it would be preferable to have the sound waves at a frequency above the audible range of the human ear for a quiet operation.

It will be understood that the structure here presented is only one means of directing sound waves against the web W, and any other convenient means for directing a sound wave against the web could be used.

Figure 8:
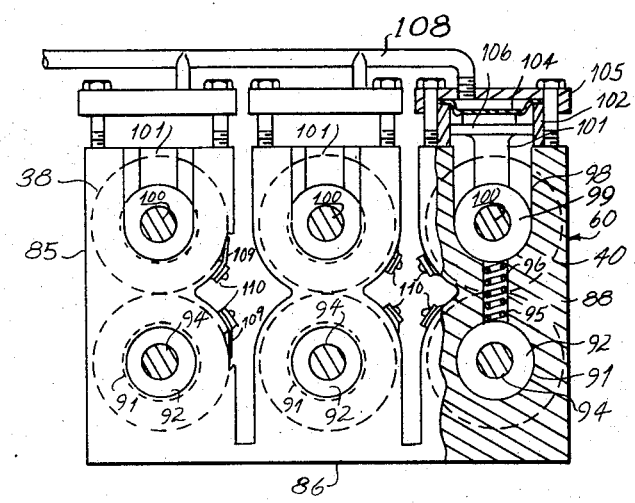
FIG. 8 is an enlarged side elevational view, partially in cross-section, showing the drafting rolls.
Figure 9:
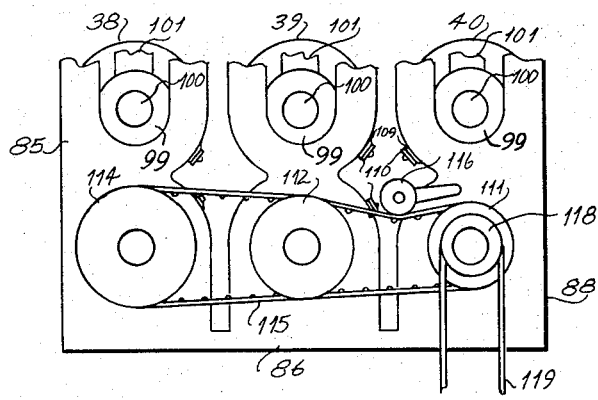
FIG. 9 is a detail showing the drive means for the drafting rolls shown in FIG. 8.

Referring to FIGS. 8 and 9 illustrating the drafting rolls, the bearing block 60 is shown in detail. The bearing block 60 is formed in three segments 85, 86 and 88. Each of the segments 85, 86 and 88 has a lower hole 91 to receive a lower bearing 92, the bearing 92 receiving the shaft 94 which carries the lower roller of each pair of rollers 38, 39 and 40. Communicating with the hole 91 which contains the bearing 92, there is a passage 95 which receives a spring 96. The passage 95 communicates between the hole 91 and a slot 98 which receives an upper bearing 99, and the upper bearing 99 receives a shaft 100 which carries the upper, complementary roller of each pair of rollers 38, 39 and 40.

The slot 98 is open at the top, and receives a piston rod 101 therein to bear against the bearing 99. Around the slot 98, there is an upstanding wall 102 which has a diaphragm 104 at its upper edge, the diaphragm 104 being held in place by a cap member 105; and, a piston 106 bears against the diaphragm 104 and is connected to the piston rod 101. There is an air tubing 108 in the cap 105 through which air under pressure will be admitted to the space between the cap 105 and the diaphragm 104. High pressure above the diaphragm 104 will urge the piston 106 downwardly to urge the piston rod 101 downwardly and urge the bearing 99 downwardly against tension of the spring 96, and urge the upper roller against the lower roller.

In the use of rollers, the rollers occasionally engage a seed or the like which will exude oil. This oil will cause fibers to stick to the roll and build up a mat completely around the roll. To prevent this, there is a doctor blade 109 on each of the rollers, the doctor blade 109 being carried by the transversely extending strap 110. The doctor blade is turned so that any material stuck to one of the rollers will be scraped off by the doctor blade 109.

Figure 10:
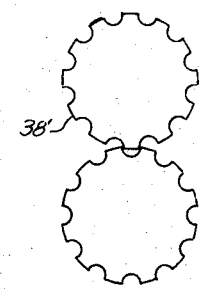
FIG. 10 is a detail showing a modified form of drafting roller.

As an alternative to the smooth rolls with doctor blades, fluted rolls as shown in FIG. 10 can be used. The fluted rollers 38' are arranged so that the flutes of one roll only partially mesh with the flutes of the opposing roll; as a result, there is no crushing of the fiber, and there will be no sticking of fiber to the rolls.

The drive means for the rollers 38, 39 and 40 is shown in FIG. 9 and includes pulleys 111, 112 and 114 on the shafts carrying the rollers. The pulleys 111, 112 and 114 are toothed pulleys to receive a toothed belt 115, sometimes known as a timing belt. The belt 115 wraps around all three of the pulleys; and, an idler 116 is mounted between the pulleys 111 and 112 to urge the belt 115 against the pulley 112 sufficiently to drive the pulley 112. It will be noticed that the pulleys are successively larger to cause the speeds of the successive rollers to increase.

A pulley 118 is mounted concentrically with the pulley 111, and is driven by a belt 119. The belt 119 can be driven from any convenient means available on the carding machine frame.

Figure 15:
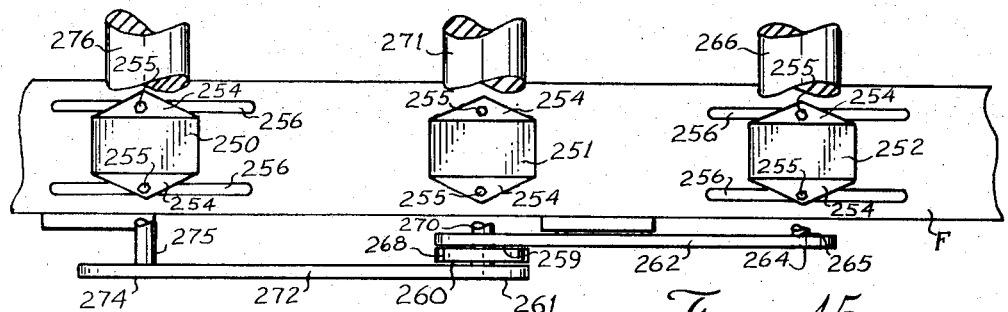
FIG. 15 is a partial top plan view of a modified form of drafting roll.
Figure 16:
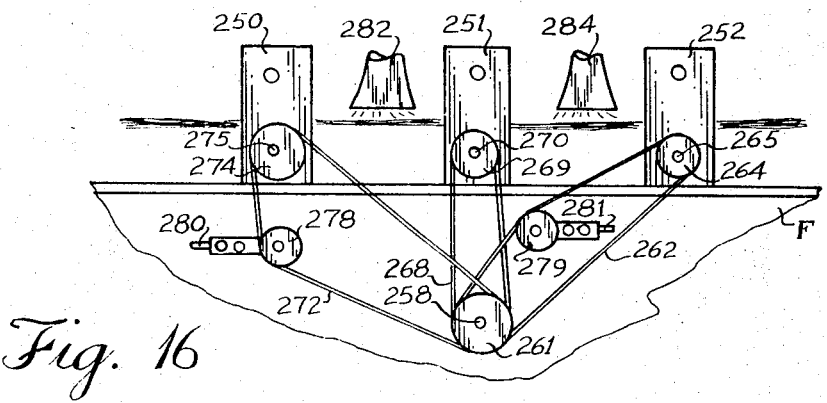
FIG. 16 is a partial side elevational siew showing the drafting rolls shown in FIG. 15; and, FIG. 17 is a somewhat schematic longitudinal cross-sectional view of the rolls shown in FIGS. 15 and 16.
Figure 17:
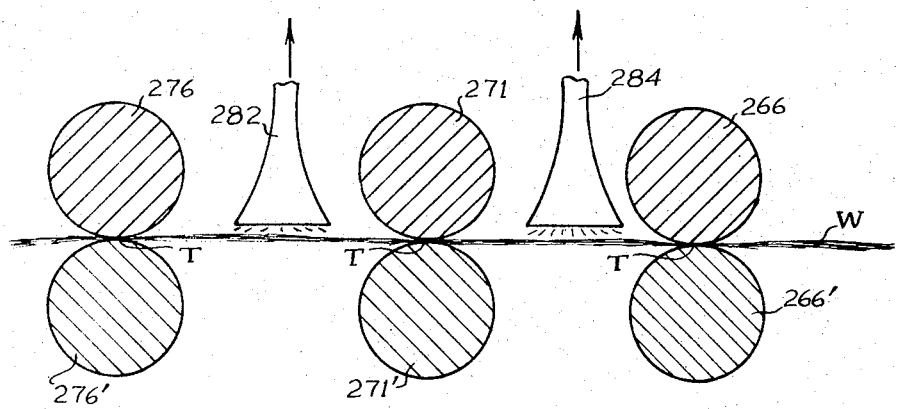

FIGS. 15, 16 and 17 show a modification of the drafting rolls. The object of the modified form of drafting rolls is to provide means for removing short fibers from the web, as well as trash. To accomplish this, the individual pairs of drafting rolls are movable with respect to one another. It will readily be seen that, if the pairs of rolls are close together, individual fibers will be held substantially all the time as the fibers pass from one pair of rolls to the next successive pair of rolls; however, if the pairs of rolls are far apart, the individual fibers must travel for some distance supported by only the web, rather than being held between the two rolls of a pair of rolls. Thus, to remove short fibers, the pairs of rolls are spaced apart so the short fibers which are to be removed must travel a considerable distance, therefore for a long time, unsupported by anything other than the web itself; whereas, the long, or staple length, fibers which are to be retained in the web are unsupported by a pair of rolls for only a very short distance, therefore for a relatively short time. Between these pairs of rolls, a current of air is passed through the web to push out the short fibers while they are unsupported between two pairs of rolls.

To accomplish the above described function, each pair of drafting rolls is mounted in a separate bearing unit, here shown as bearings 250, 251 and 252. Each bearing 250, 251 and 252 has a pair of bottom flanges 254 through which bolts 255 pass to engage the frame F of the carding machine. The frame F is provided with elongated slots 256 for the bearings 250 and 252 to allow movement of the bearings 250 and 252 toward and away from the bearing 251.

To drive the pairs of rolls, there is a shaft 258 extending from the frame of the carding machine, and the shaft 258 carries three pulleys 259, 260 and 261. A belt 262 goes over the pulley 259, and around a pulley 264 that is on the shaft 265 to drive the rolls 266 and 266'; a belt 268 goes around the pulley 260, and around a pulley 269 that is on the shaft 270, to drive the rolls 271 and 271'; and, a belt 272 goes around the pulley 261, and around a pulley 274 that is on the shaft 275, to drive the rollers 276 and 276'. As the bearings 250 and 252 are moved toward and away from the bearing 251, the belts 272 and 262 will become slack or taut in accordance with the movement of the bearings. To allow adjustment of the belts 272 and 262, there are idler pulleys 278 and 279 to engage the belts 272 and 262, respectively, the idler pulleys 278 and 279 being adjustable by moving in slots 280 and 281. It will be understood that the two rolls in each pair of rolls are geared together, as in the previously described embodiment of the drafting rolls.

Between each of the pairs of rolls, there is a nozzle, as nozzles 282 and 284. It will be understood that the nozzles 282 and 284 extend entirely across the web W, and the opening of the nozzles is very close to the web. A source of vacuum (not shown) is connected to each of the nozzles 282 and 284 to cause a current of air to pass through the web W and into the nozzles 282 and 284, the current of air carrying with it the short fibers and some trash and the like.

It will now be seen that, if fibers shorter than, say, ⅞ inch are to be removed from the web, the pairs of rolls will be placed so that their tangent points T are about an inch or so apart, the rolls providing a line across the web at which the web is held. Since the pairs of rolls are driven successively faster, the tangent points T cannot be placed ⅞ inch or less apart because the staple length fibers would be pulled apart; however, with the tangent points T separated by a distance slightly greater than the staple length of the fibers, the fibers will be released by both adjacent pairs of rolls for only a very short time; whereas, the short fibers which are to be removed will be free of both adjacent pairs of rolls for a considerable length of time, during which the short fibers will be removed from the web by the current of air caused by the vacuum on the nozzles 282 and 284.

Though three pairs of drafting rolls and two nozzles have been shown, it will be understood that any desired number of drafting rolls and nozzles can be employed, depending on the results desired.

Referring now to FIG. 3 of the drawings it will be seen that, as the web passes from the drafting rolls it will be fed to a roll 125 which is rotating in a counterclockwise direction as viewed in FIG. 3. The roll 125 is one of a series of eight such rolls that are positioned adjacent one another so that the web will pass successively from one roll to another. Each of these rolls is, in this embodiment, five inches in diameter and has fine metallic clothing on its surface.

To journal the rolls for rotation, each roll is provided with a shaft 126 that is received by a bearing block 128. The bearing blocks 128 are square blocks that are of such size that the blocks can be stacked one on top of another, or placed side by side, and the rolls themselves will be spaced the correct distance for transfer of the web of fibers from one roll to the adjacent roll. Of course any desired construction can be used, but this particular arrangement is especially convenient since any number of rolls can be stacked together in building-block fashion.

Above the roll 125, there are three additional rolls stacked in a vertical line, the rolls being designated 129, 130 and 131; adjacent the roll 131, there is a roll 132 and a roll 134 above the roll 132; and, there is a roll 135 beside the roll 134, and a roll 136 directly above the roll 135. With this arrangement, the web can pass in a serpentine path around the rolls as shown by the broken line.

Trash is removed from the web by the rapid acceleration as the fiber changes from one roll to the next, and by centrifugal force as the fiber passes around the roll. Dirt coming from the web as it passes around the roll 125 can, of course, fall directly to the floor; however, dirt coming from the roll 129 will tend to fall back on the web as it passes from the drafting rolls 40 to the roll 125; therefore, a trough 138 is provided substantially at the tangent point of the rolls 125 and 129. The trough 138 is arranged to catch dirt or other trash that will fall from the web as it passes around the roll 129; and, a suction line or the like can be used to remove trash from the trough 138. Trash from the roll 130 can fall directly to the floor, so no trough is provided; trash from the roll 131 will tend to fall on the web, so a trough 139 is provided; and, a similar procedure is followed for the remainder of the rolls 132 through 136.

To drive the rolls, there is a motor 140 having a belt 141 which passes around the pulley 142 that is on the uppermost roll 136. This portion of the drive is best shown in FIG. 2 of the drawings. Concentric with the pulley 142, there is a pulley 144 that has a belt 145 thereover; and, the belt 145 passes around a pulley 146 that is on the roll 134, around an idler pulley 148, and around a pulley 149 that is on the roll 135. A pulley 150 that is concentric with the pulley 146 on the roll 134 has a belt 161 therearound which also passes around a pulley 152 that is on the roll 131; and, a pulley 154 that is concentric with the pulley 152 has a belt 155 which passes around a pulley 156 that is on the roll 129. The roll 131 has a pulley 158 on its opposite end as shown in FIG. 1b of the drawings. A belt on the pulley 158 drives a pulley 159 on the roll 132; a belt on the pulley 159 drives a pulley 160 that is on the roll 130; and, a belt on the pulley 160' drives a pulley 161 that is on the roll 125. It will thus be seen that all the rolls 125 through 136 are driven from the motor 40, and the rolls are driven at successively higher speeds with the roll 125 being the slowest, and the roll 136 being the fastest.

The fiber is doffed from the roll 136 by a current of air. The construction is best shown in FIGS. 2 and 3 of the drawings.

The mouth of the duct 41 is adjacent the roll 136; and, the opening in the duct 41 is substantially tangent to the roller 136. The opening in the duct 41 is relatively narrow at 165 to provide a high velocity stream of air, and the duct 41 widens toward the upper end.

At the upper end of the duct 41 there is a perforated, cylindrical screen 166 on which fibers collect to form a bat. Each end of the screen 166 is mounted for rotation in supports 168. Within the cylindrical screen 166, there is a box 169 that remains stationary as the screen 166 rotates, the walls of the box 169 being aligned with the widest portion of the duct 41 so that the box 169 acts somewhat as a continuation of the duct 51. There is a pipe 170 which leads axially from one end of the box 169, the pipe 170 going to the suction side of a blower 171; therefore, it will be seen that the blower 171 will remove air from the box 169 to cause a current of air through the duct 41, through the box 169, the pipe 170 and out through the blower 171.

The fiber will collect on the screen 166, and the screen will rotate in a counterclockwise direction as viewed in FIG. 3 of the drawings. When the fiber passes the walls of the box 169, the fiber will tend to drop off the screen 166 and will fall on a belt 44. The belt 44 extends completely beneath the screen 166, and is supported for rotation on a pair of rollers 174 and 175. Movement of the belt 44 is such that the top flight thereof is moving to the right as viewed in FIG. 3 of the drawings. The belt 44 will carry the bat of fibers away from the bearings 168, and the bat of fibers will pass between the calender rolls 45 and will slide down the chute 46 and into the carding machine 50.

The carding machine 50 is a conventional carding machine, except that the speed of the carding machine 50 is greatly increased over the usual speeds.

Second embodiment

Another embodiment of the invention utilizes basically the same system by taking the web of fibers from the drafting rolls generally indicated in FIG. 11 at 36' with transfer rolls which will feed the web into the licker-in, the licker-in feeding the web of fibers into the carding cylinder as is normal. The device shown in FIG. 11 includes a first transfer roll 180 which rotates counterclockwise as indicated by the arrows, the transfer roll 180 taking the web from the drafting roll 36'; and, a second transfer roll 181 takes the web from the transfer roll 180, the transfer roll 181 rotating in a clockwise direction as indicated by the arrow. The licker-in 182 rotates in a counterclockwise direction as indicated by the arrow, and the card cylinder 184 rotates in a clockwise direction. With this arrangement, the junction of the transfer roll 181 and the licker-in 182 moves in a downward direction which tends to throw fibers off the rolls to be lost underneath the machine. To preclude such loss, the licker-in 182 is made with very fine metallic clothing, as opposed to the normally very coarse metallic clothing, so that the licker-in will hold the fibers more firmly. Also, there is an imperforate screen 185 which is attached to the conventional card screen 186, passes under the licker-in 182 and has a cusp 188 that is inserted between the second transfer roll 181 and the liker-in 182. From there, the screen 185 passes around the transfer roll 181, is directed toward the roller 180, and terminates therebelow. With both the screen 185 and the fine metallic clothing on the licker-in 182, the waste fiber is reduced to a negligible amount.

Third embodiment

Figure 12:
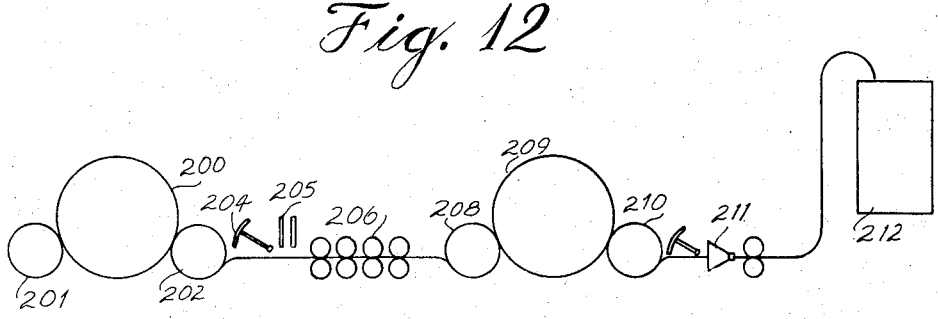
FIG. 12 is a schematic showing of a third embodiment.

Another embodiment of this invention is shown schematically in FIG. 12 of the drawings, and includes a carding cylinder 200 having a licker-in 201 to feed fiber to the carding cylinder 200; and, a doffer 202 to remove the fiber from the carding cylinder 200. A comb 204 is used to assist in the removal of the fibers from the doffer as in the previously described embodiments. There is a shaker indicated at 205 to strike the web of fiber as it comes off the doffer 202 to shake trash therefrom. After the shaker 205, the web passes between a plurality of pairs of drafting rolls 206. As previously described, the successive pairs of drafting rolls 206 are rotated at increasing speeds to draw out the web into a very thin web to allow the trash to fall therefrom.

Though four pairs of drafting rolls 206 are shown, any number of rolls can be used. It will be realized that, the greater the cleaning desired, the more pairs of drafting rolls 206 will be used. From the drafting rolls 206, the web will be picked up by the licker-in 208 to be fed into a second carding cylinder 209. The fiber will be doffed from the carding cylinder 209 by a doffer roll 210; and, the web will be passed through a trumpet 211, and the resulting sliver will be coiled in a can 212.

Fourth embodiment

Figure 13:
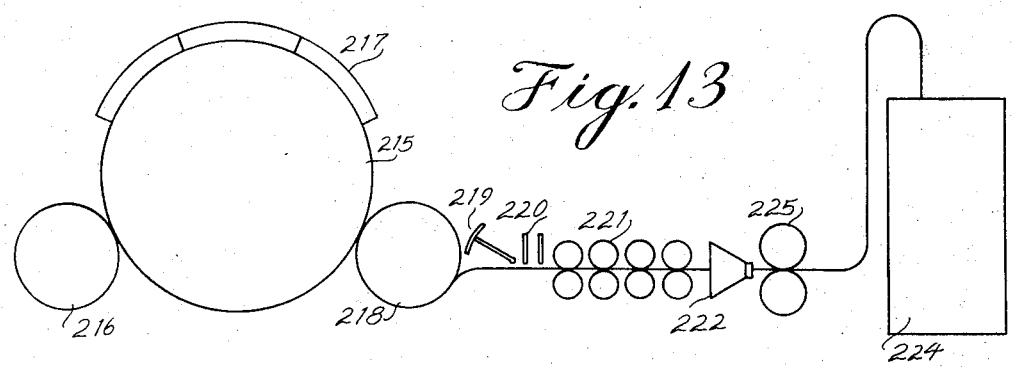
FIG. 13 is a schematic showing of a fourth embodiment.

The next embodiment of the invention, shown in FIG. 13, includes a carding cylinder 215 having granular flats 217 to which fiber is fed by the licker-in 216, and doffed by the doffer roll 218. A comb 219 is used to assist in the removal of the fiber from the doffer roll 218; and, the web of fibers passes beneath a shaker indicated at 220, and thence through a plurality of drafting rolls 221. Since the fiber is in a web form as it passes from the drafting rolls 221, the web can be passed directly through a trumpet 222 to form a sliver which is coiled in a can 224. As is conventional, a sliver is passed through calender rolls 225 after passing through the trumpet 222 in order to provide a firmer sliver.

Fifth embodiment

Figure 14:
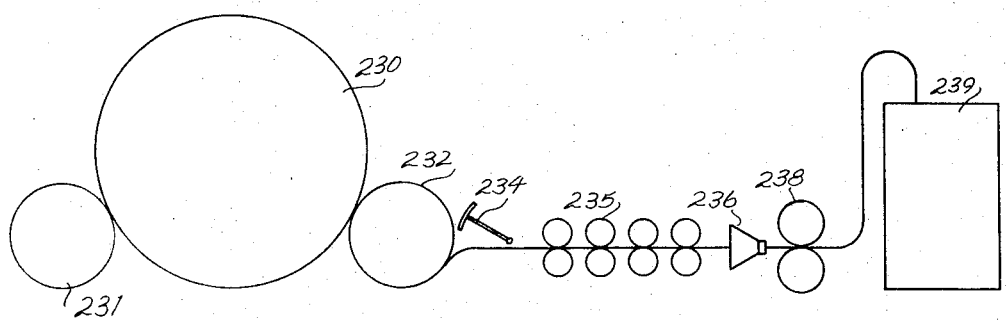
FIG. 14 is a schematic showing of a fifth embodiment.

The next embodiment of the invention shown in FIG. 14 includes a carding cylinder 230 having a licker-in 231 and a doffer roll 232. A comb 234 is used to remove the fibers from the doffer roll 232, and the web is passed from the doffer roll 232 to a plurality of drafting rolls 235. The web, after passing from the last of the pairs of drafting rolls, is passed through a trumpet 236 to form a sliver which is made more firm by the calender rolls 238; and, from the calender rolls 238, the sliver is coiled in a can 239.

Operation

In operation of the device, cotton or other fiber will be taken directly from the bale and placed into the hopper 11 of the feeder 10. The fiber will be fed from the feeder 10 along the apron 12 and pressed into a bat to be fed into the first carding machine 20. There will of course be some cleaning and parallelization of fibers in the carding machine 20; however, the primary purpose is to form a web of the fibers, which is taken off the doffer 32 with the aid of the comb 34. The comb 34 does some cleaning by beating on the web of fibers; however, the comb 34 tends to beat on the fiber in a direction longitudinally as well as transversely of the web; and, a compressive force in the longitudinal direction of the web tends to fold the fibers back on themselves which produces neps in the web.

From the doffer 32, the web is fed into a shaker where the blades 64 beat on the web in a direction transverse to the web. Beating in this transverse direction tends to remove trash from the fibers without crumpling the fibers, so no neps are formed. Thereafter, the web is fed to drafting roll 36 where successive pairs of rollers 38, 39 and 40 draw out the web to parallelize the fibers. Then, the web is fed into the roll 125 where the web passes in its serpentine path around each of the rolls 125 through 136. While traveling in this serpentine path, the fibers are subjected to very strong centrifugal force which will throw trash from the fibers; also there is a large longitudinal force due to the rapid acceleration as the fibers go from one roll to the next, faster, roll. It will be understood that, by this time, the web is quite thin so that trash can be easily separated therefrom. Though eight rolls are here shown, it will be recognized that more or fewer rolls can be used depending on the amount of cleaning required.

The fibers are doffed from the roll 136 by the current of air which will separate the web into small bundles of fibers and carry fibers through duct 41. With the fibers substantially individualized, small particles of trash, such as dust and the like, will be removed from the fibers and will pass through the perforate screen 166 to be carried out the pipe 170 and through the blower 171. The fibers will collect on the screen 166 and form a bat which will fall off the screen 166 and on the belt 44. The rather loose bat of fibers on the belt 44 will be pressed together more firmly by the calender rolls 45 to be fed into the second carding machine 50.

The second embodiment, which is shown in FIG. 11, operates in a very similar fashion. The process through the drafting rolls 36' is the same as for the first embodiment; then, fiber will be fed to the first transfer roll 180 which will do some cleaning by allowing trash to be thrown from the fiber by centrifugal force as the fibers pass underneath the transfer roll 180. Further cleaning may take place at the transfer roll 181; however, it will be seen that the trash will be thrown upwardly and may fall back on the web. This can be precluded by the provision of a vacuum means to receive the trash after it is thrown from the web.

The third embodiment is quite similar to the second embodiment. The third embodiment has no transfer rolls between the drafting rolls 206 and the licker-in 208 of the second carding machine. Fiber is fed to the card cylinder 200 by the licker-in 201, and is taken therefrom by the doffer roll 202. The fiber is removed from the doffer 202 as a web, and is shaken by the shaker 205 to remove trash therefrom. From the shaker 205, the web passes through the successive pairs of drafting rolls 206 to pull the web into a much thinner web to allow trash to fall therefrom. From the last pair of drafting rolls 206, the web passes to the licker-in 208, thence into the carding cylinder 209 to be doffed by the doffer 210 and finally coiled in the barrel.

Operation of the fourth embodiment is, again, quite similar; however, there is only one carding machine. The fibers are fed into the carding cylinder 215 by the licker-in 216. The carding cylinder 215 has stationary granular flats 217 to parallelize the fibers without removing any fibers from the mass of fibers that is on the carding cylinder 215. It is well recognized that the granular flat will parallelize fibers but will not remove trash from the mass of fibers; however, in the present embodiment, the fibers are cleaned sufficiently after passing from the carding cylinder 215.

The fibers are removed from the carding cylinder 215 by the doffer roll 218, and the fibers, as a web, are removed from the doffer roll 218 by the comb 219. The web is passed beneath the shaker 220 and drawn out by the drafting rolls 221. From the last pair of drafting rolls 221, the web passes through the trumpet 222, through the calender rolls 225, and into the barrel 224.

In the fifth embodiment, fibers are fed into the carding cylinder 230 by the licker-in 231, and are removed from the cylinder 230 by the doffer roll 232. The fiber is removed from the doffer roll 232 by the comb 234, the web of fibers then passing through successive drafting rolls 235. Directly from the drafting rolls 235, the web passes into a trumpet 236, through calender rolls 238 and into the barrel 239. In this embodiment, only the drafting rolls 235 are used between the comb 234 and the trumpet 236. The principal use of this embodiment would be for the processing of synthetic fibers and the better grades of cotton in which there is no appreciable amount of trash to be cleaned from the fiber. The device shown in this embodiment will do some cleaning with the drafting, and will rid the fiber of neps, and parallelize fibers to form a very good sliver.

It will thus be seen that the method and apparatus of the present invention provide very simple, yet effective, apparatus for cleaning fibers. The apparatus here shown includes much less machinery than is normally required in a cotton processing mill, and has a substantially greater output than the usual apparatus.

Though specific apparatus is here presented, it will be understood that the embodiments of the invention here described are by way of illustration only, and are meant in no way to be restrictive; therefore, numerous changes and modifications may be made, and the full use of equivalents resorted to, without departing from the spirit or scope of the invention as defined in the appended claims.

What is claimed is:

1. In an apparatus for separating foreign matter from fibers, carding means for forming said fibers into a web of fibers; first drafting means for drafting said web of fibers between a plurality of successive pairs of drafting rolls; shaker means for shaking foreign matter from said web of fibers as said web of fibers passes between said carding means and said first drafting means; second drafting means positioned to receive said web of fibers from said first drafting means for additionally drafting said web of fibers by transferring fibers in said web of fibers to the surfaces of each of a plurality of successive rolls having progressively higher surface speeds to provide a relatively thin layer of fibers on the last of said rolls; and collecting means for drawing fibers from said thin layer of fibers on said last of said rolls by an upwardly moving current of air passing over said last of said rolls so as to separate said fibers and for collecting fibers in said current of air on a collecting screen through which said current of air passes and from which fibers are passed for further processing.

2. The apparatus of claim 1 in which said shaker means includes a blade member mounted adjacent said web of fibers and reciprocating means for reciprocating said blade member to periodically strike said web of fibers.

3. The apparatus of claim 1 in which said shaker means includes vibrating means for directing sound waves against said web of fibers.

4. The apparatus of claim 1 in which a roll in each of said plurality of successive pairs of drafting rolls in said first drafting means is urged toward a second roll by air under pressure.

5. The apparatus of claim 1 in which at least some of said drafting rolls in said plurality of successive pairs of drafting rolls in said first drafting means are fluted.

6. The apparatus of claim 1 including nozzle means for passing a current of air through said web of fibers between adjacent pairs of said plurality of successive pair of drafting rolls in said first drafting means.

7. The apparatus of claim 1 in which said surfaces of each of a plurality of successive rolls in said second drafting means are positioned to define a serpentine path along which fibers pass.

8. The apparatus of claim 1 in which each of said plurality of successive rolls in said second drafting means has a surface speed sufficient for centrifugal force to remove foreign matter from a layer of fibers on each of said plurality of successive rolls.

9. The apparatus of claim 1 in which said current of air moves upwardly in a duct and in which said collecting screen is a cylindrical rotating screen positioned at an end of said duct remote from said thin layer of fibers.

References Cited

UNITED STATES PATENTS

| | | | |
|---|---|---|---|
| 718,261 | 1/1903 | Laurency | 19—106 |
| 1,862,542 | 6/1932 | Laurency | 19—106 |
| 2,513,298 | 7/1950 | Fairbairn | 19—98 |
| 2,854,091 | 9/1958 | Roberts et al. | 55—292 X |
| 2,858,574 | 11/1958 | Boer | 19—65 X |
| 2,907,404 | 10/1959 | Mare | 55—277 X |
| 3,003,195 | 10/1961 | Varga | 19—106 X |
| 3,053,031 | 9/1962 | Vedder et al. | 55—292 |
| 3,145,428 | 8/1964 | Reiterer | 19—106 |

FOREIGN PATENTS

| | | |
|---|---|---|
| 831,401 | 6/1938 | France. |
| 1,338,631 | 8/1963 | France. |
| 2,467 | 1854 | Great Britain. |
| 3,874 | 1879 | Great Britain. |
| 320,761 | 10/1929 | Great Britain. |
| 325,818 | 2/1930 | Great Britain. |
| 568,029 | 10/1957 | Italy. |

DORSEY NEWTON, *Primary Examiner.*